United States Patent [19]

Margolin

[11] Patent Number: 4,830,446

[45] Date of Patent: May 16, 1989

[54] PRODUCTION INITIALIZER FOR FIBER OPTIC DOCUMENT SCANNER

[75] Inventor: George D. Margolin, Newport Beach, Calif.

[73] Assignee: Photon Devices, Ltd., Newport Beach, Calif.

[21] Appl. No.: 116,518

[22] Filed: Nov. 3, 1987

[51] Int. Cl.$^4$ .............................................. G02B 6/04
[52] U.S. Cl. .................................. 350/6.5; 350/96.24; 350/96.25
[58] Field of Search .............................. 350/6.5–6.91, 350/96.24, 96.25, 96.27, 96.29; 250/227, 578; 356/73, 73.1; 358/200; 355/1

[56] References Cited

U.S. PATENT DOCUMENTS

| | | | |
|---|---|---|---|
| 2,939,362 | 6/1960 | Cole | 355/1 |
| 3,114,283 | 12/1963 | Gruner | 355/1 |
| 3,770,909 | 11/1973 | Rose et al. | 358/200 |
| 4,515,479 | 5/1985 | Pryor | 250/578 |
| 4,639,130 | 1/1987 | Koike et al. | 356/73.1 |
| 4,674,834 | 6/1987 | Margolin | 350/96.25 |
| 4,727,423 | 2/1988 | Kaneko et al. | 364/518 |

FOREIGN PATENT DOCUMENTS 0049657 3/1984 Japan ................................. 364/571

OTHER PUBLICATIONS

Thorpe, A. C., "Optical Scanner", IBM Tech. Disc. Bull., 12-1961, p p. 20–21.
Distefano et al., "Optical Scanning Device for Imaging Interior Surfaces", IBM Tech. Disc. Bull., 6-1983, pp. 29–31.
Grant, D. E. "Magneto-Optic Readout of Crosstape Recording", IBM Tech. Discl. Bull., 4-1974, pp. 3496–3497.

Primary Examiner—John K. Corbin
Assistant Examiner—Martin Lerner
Attorney, Agent, or Firm—Stanger, Michaelson, Reynolds, Spivak & Tobia

[57] ABSTRACT

A production initializer for a plurality of document scanners each comprising a fiber optic subassembly and a discrete sensor array is provided by moving a spinning light beam along an axis and positioning the linear entrance field of each of a plurality of subassemblies along radial axis. The beam spins at a rate fast compared to the rate at which the beam is advanced along the axis. A large number of subassemblies can be initialized simultaneously in this manner.

12 Claims, 2 Drawing Sheets

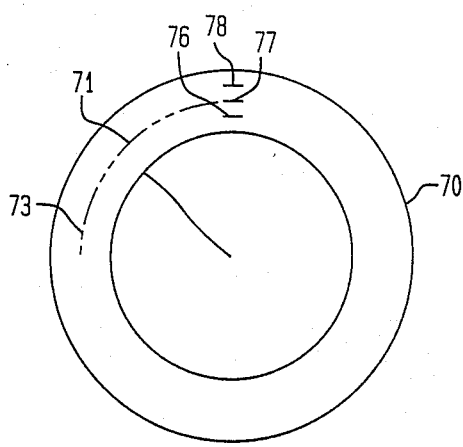
FIG.2
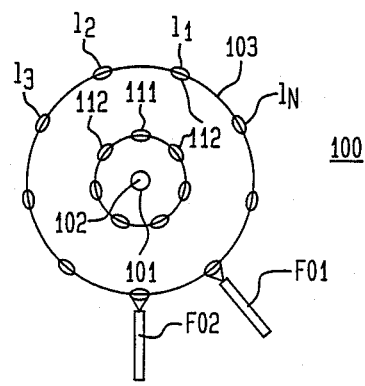
FIG.3
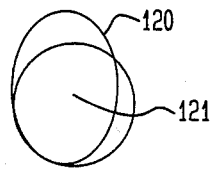
FIG.4
FIG.5
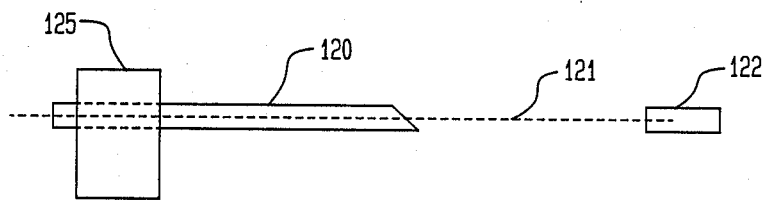

PRODUCTION INITIALIZER FOR FIBER OPTIC DOCUMENT SCANNER

FIELD OF THE INVENTION

This invention relates to fiber optic document scanners and more particularly to such scanners which are coupled to an array of discrete sensors at their exit field.

BACKGROUND OF THE INVENTION

U.S. Pat. No. 4,674,834 of George D. Margolin, issued June 23, 1987 and assigned to the assignee of the present invention discloses a document scanner including a fiber optic subassembly. The fiber optic bundle in the disclosed scanner is non-coherent. That is to say, there is no known relationship between the positions of two ends of any particular fiber in their respective fields.

To obtain the positional correspondence between the two ends of a fiber, the patent calls for attaching an array of discrete sensors to the exit field of the bundle and noting the address of any illuminated sensor in the array when light is directed into an end of a fiber in the entrance field. By sending light into a fiber in the entrance field, we, so to speak, are asking each fiber where its exit end is positioned.

The initializing procedure is easy to visualize but cannot actually be carried out as described. The reason for this is that the fiber ends in the entrance field are very tiny—many thousands over the widthg of an 8½ inch document. Therefore, the fibers are only a fraction of the size of a human hair. Moreover, the fiber ends move, during production, from their ideal positions. The actual position of the fiber ends in the entrance field is not known. For a document scanner which requires an ideally linear entrance field, the fiber ends are displaced laterally from the axis of the line, are unevenly spaced along the axis and frequently bunch up. Not only is the position of each fiber unknown, but even if it were known, the apparatus to move a beam to the known position would be too costly to use.

The above-mentioned patent discloses a technique for moving a slit along the axis of the entrance field. The slit has a width small compared to the diameter of a fiber and is moved in increments small compared to that diameter. For an entrance field of 8½ inches, the slit is moved in 10,000 increments, for example. The sensor array is interrogated 10,000 times, one for each increment. The addresses of the illuminated sensors are recorded during each interrogation.

Each fiber has a diameter large compared to the size of a sensor in the array. Thus, each fiber corresponds to about twelve sensors. This relationship of many sensors to each fiber permits the use of defective sensor arrays as well as the opportunity to choose sensors of like sensitivities. Typically, at least one sensor is chosen each time the initializing beam is incremented and the sensor array is interrogated. The initializing procedure thus can be seen to result in the initialization of space rather than fibers relating beam position to sensor address. It should be clearly understood that the sequence of sensor addresses is obtained for the sequence of slit positions not necessarily for the sequence of fiber ends in the entrance field. The initializing procedure results in the organization of pixels (picture elements) of the exit field of a fiber optic bundle to correspond to the organization of pixels in the entrance face of that bundle as disclosed fully in my above-mentioned patent.

The present invention addresses the problem of how one initializes large numbers of fiber optic subassemblies in production.

BRIEF DESCRIPTION OF AN ILLUSTRATIVE EMBODIMENT OF THE INVENTION

In accordance with the principle of the present invention, a laser beam is moved along the center axis of an essentially hollow cylinder. The beam spins rapidly as it advances. Fiber optic subassemblies are mounted in fixtures about the periphery of the cylinder such that the plane of each subassembly aligns along an imaginary radial axes of the cylinder with the entrance field directed inwardly. The spinning laser thus defines a "solid disk" of light which to each subassembly functions as an advancing "slit" of light much as in the above-mentioned patent.

The exit ends of the subassemblies are exposed beyond the periphery of the cylinder with the sensor array in place. A card bearing the electronics to, inter alia, store the characteristic address string obtained during initialization is attached to each sensor array. As the laser spins and advances along the axis of the cylinder, the subassemblies are initialized, en mass, and are in condition for removal from their fixtures.

In another embodiment, a mirror is used to move the beam rather than spin the laser itself.

In still another embodiment, mirrors are used to form multiple slits from a single compact light source, which slits are moved along the axis of the cylinder.

BRIEF DESCRIPTION OF THE DRAWING

FIGS. 2 through 5 are schematic representations of portions of alternative production initializers in accordance with other aspects of this invention.

DETAILED DESCRIPTION OF AN ILLUSTRATIVE EMBODIMENT OF THE INVENTION

Figure 1:
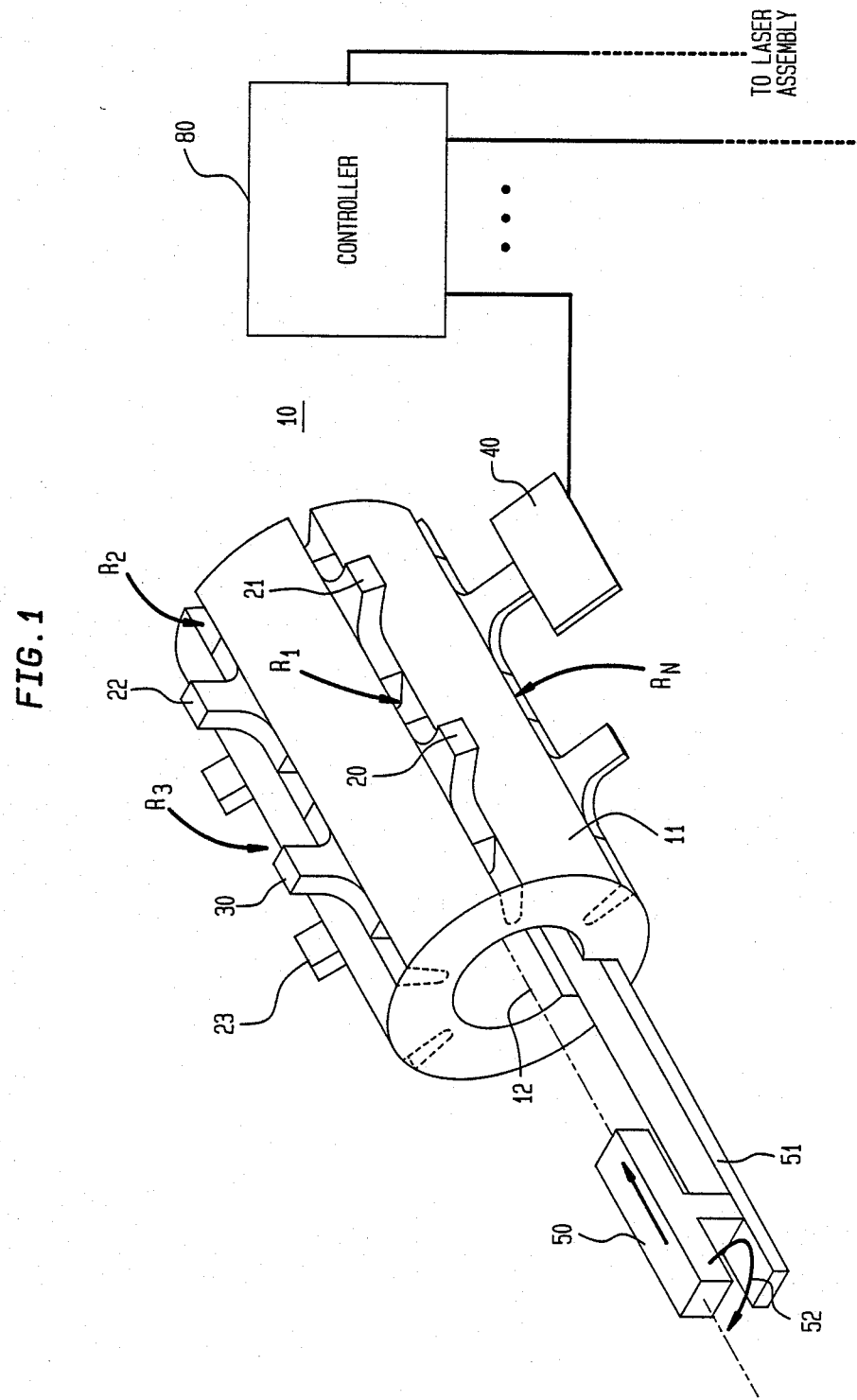
FIG. 1 is a schematic representation of a production initializer in accordance with one aspect of this invention.

FIG. 1 shows a production initializer 10 in accordance with this invention. The initializer comprises an essentially hollow cylindrical housing 11 having a central axis 12. Housing 11 includes radially arranged slots R1, R2, R3 . . . $R_N$ which are adapted to receive fiber optic subassemblies 20, 21, 22, 23—i.

The fiber optic subassemblies are arranged in the slots so that the entrance field of each is extending inwardly towards axis 12. For document scanners, the entrance fields are linear in shape, facing axis 12 and extending in parallel therewith. The exit field of each subassembly faces outwardly.

The exit field is rectangular as indicated at curved arrow 30. The sensor array which is part of the subassembly is typically attached to the ends of the fiber optic bundle which define the exit field. An electronics card 40 is attached to each of these sensor arrays to store the sequence of addresses obtained for the associated subassembly during the initialization operation.

A laser assembly 50 is adapted for movement along axis 12. One convenient mechanism for moving the laser is a chain link arrangement 51. In addition, the laser position of laser assembly 50 is adapted to rotate clockwise in a plane normal to the axis as shown by curved arrow 52. Laser assembly 50 conveniently includes a motor for rotating or spinning the laser.

Alternatively, laser assembly 50 is adapted to project a light beam at a mirror which is rotated in a manner to move a beam to sweep out a path of an imaginary disk as the "disk" moves along axis 12. The result is to, in effect, move a slit of light along the entrance field of each subassembly as the beam moves along the axis. Since each subassembly is about nine inches long and a little over a quarter of an inch wide, a cylinder less than twenty inches long and having a diameter of ten inches easily can be adapted to hold tens of subassemblies at once. An assembly 50 operative to spin a laser beam (or any narrow beam) at even a modest rate can initialize hundreds of subassemblies in this manner in minutes.

The apparatus of FIG. 1 may be visualized as only a small portion of an annular tube 70 as shown in FIG. 2. In this instance, the beam projector assembly 71 would advance along the axis 73 of the annular tube while the beam spins as described hereinbefore. Fiber optic subassemblies, 76, 77, 78—N, are again aligned with axis 71 with their entrance fields facing inwardly. Operation is entirely analogous to that described in connection with FIG. 1.

The beam from any beam projector herein is adapted to sweep out an area of a solid disk between incremental movements of the beam projector along the axis of the cylinder. This requirement is important whether the projector assembly is moved incrementally or the assembly is moved continuously and the sensor array is interrogated periodically. A prime advantage of the present apparatus is that each subassembly "sees" a slit of light each time the associated sensor array is interrogated. It is clear then that the light source need only be on when aligned with an assembly.

The various cards (40 of FIG. 1) are connected to a controller which coordinates the sequential interrogation of the respective sensor arrays with the movement of the beam projector assembly and the spin of the beam. Such a controller is indicated by block 80 of FIG. 1. Each card 40 as represented in the figure is taken to include a discrete sensor array not shown separately for simplicity.

FIG. 3 shows an arrangement 100 where a lens system is employed rather than a system for spinning a light beam.

In the embodiment of FIG. 3, a beam projector 101 travels along axis of a cylinder represented by circle 103. A plurality of lenses 110, 111, 112—is affixed to the projector to columnate the beam into a slit of light. A second set of lenses, 11, 12, 13—1n and rotating mirror with fixed laser beam is positioned around cylinder 103 to capture the projected slit of light and to focus the captured light onto an associated entrance field of a fiber optic subassembly F.O.1, F.O.2—.

FIG. 4 shows the end view of a circular rod 120 which moves along the axis 121 of a cylinder (not shown) upon which fiber optic subassemblies can be mounted for production initialization as discussed in connecton with FIG. 1. The rod although circular has an end cut at a 45° angle. The cut end is mirrored and is withdrawn from an initial position along the axis. A laser beam source 122 is adapted to direct a beam at mirrored end in a manner to reflect the beam toward the periphery of the cylinder. Also, the rod is rotated by means 125 at a rate fast compared to the rate of withdrawal along the axis to, effectively, provide a moving slit for each fiber optic subassembly mounted. FIG. 5 shows the cut end of rod 120 and its position with respect to laser beam source 122.

It should be clear that the cylinder itself may be moved rather than the beam source or mirror. Further, even the fiber optic subassemblies may be moved instead. All that is important is that relative motion is produced between the spinning beam and the fiber optic subassemblies so that the light formed by the spinning beam encounters entrance fields of a plurality of fiber optic subassemblies.

The invention has been described in terms of a noncoherent fiber optic bundle. It should be understood that coherent fiber optic bundles energy coupled to arrays of discrete sensors at their exit fields can be initialized in this manner also.

Moreover, it should be understood that the sensor array need not be accessible on a random access basis and that a CCD or a CID array can be coupled to the bundle and the resulting system also can be initialized as disclosed.

Also, the most practical embodiments of this invention employ visible light. But it should be understood the electromagnetic radiation beyond the visible spectrum can be used as well.

The invention also has been described in terms of a fiber optic bundle. The fibers in such bundles usually comprise a core with a cladding as is well understood. But any radiation conduits could be initialized as disclosed. It is contemplated that all such variations will be encompassed by the following claims:

What is claimed is:

1. Apparatus for establishing the exit field position of each fiber of a plurality of fiber optic bundles each of said bundles having a linear entrance field and on exit field wherein said exit field is coupled to an array of discrete sensors, said apparatus including means for aligning said entrance fields with a first axis, each of said bundles extending radially outwards from said axis, each of said entrance faces being spaced apart from said axis, means for moving a light source along said axis, and means for directing light from said source at each of said entrance fields in a manner to impinge upon consecutive fiber ends in said entrance fields as said light source is moved.

2. Apparatus in accordance with claim 1 wherein said means for directing light comprises a plurality of lenses arranged about said source, each of said lenses being positioned to image said light from said source to form a narrow slit of light astride an associated one of said entrance fields.

3. Apparatus for initializing fiber optic bundles energy coupled to an array of discrete sensors at the exit field thereof, said apparatus including means for aligning the entrance fields of a plurality of fiber optic subassemblies with a first axis, means for moving a light beam along said axis in a manner to direct light at at least a small portion of first of the entrance fields of said subassemblies, and means for spinning said beam in a plane normal to said axis at a rate fast compared to the movement of said beam along said axis.

4. Apparatus in accordance with claim 3 wherein said beam is a laser.

5. Apparatus in accordance with claim 4 also including means for rotating said laser in a manner to project a laser beam outward from said axis.

6. Apparatus in accordance with claim 5 also including means for fixing said plurality of fiber optic subassemblies in positions displaced from said axis and radially aligned therewith, said subassemblies having the entrance field of each directed inwardly such that said beam rotates along a path perpendicular to the linear entrance field of each of said subassemblies.

7. Apparatus in accordance with claim 6 wherein said means for fixing comprises an essentially hollow cylinder, said cylinder including a peripheral surface, said surface including apertures adapted to accept said subassemblies.

8. Apparatus in accordance with claim 7 in combination with a plurality of said subassemblies in said apertures, each of said subassemblies being energy coupled to an associated array of discrete sensors, and electronic means coupled to each of said arrays for determining a sequence of addresses of illuminated sensors in each of said arrays for organizing pixels transmitted by said arrays into the sequence in which the pixels are organized in the respective entrance field.

9. Apparatus in accordance with claim 8 also including control means for controlling the movement of said beam along said axis, the formation of said beam into slits for each of said subassemblies, and the determining of said sequences of addresses.

10. Apparatus in accordance with claim 4 also including mirror means adapted to rotate in a manner to project said laser beam outward from said axis.

11. Apparatus in accordance with claim 10 also including means for fixing said plurality of fiber optic subassemblies in positions displaced from said axis and radially aligned therewith, said subassemblies having the entrance field of each directed inwardly such that said beam rotates along a path perpendicular to the linear entrance field of each of said subassemblies.

12. Apparatus in accordance with claim 3 wherein said beam has a diameter small compared to the diameter of a fiber of one of said arrays.

* * * * *